US010885768B2

(12) United States Patent
Longhenry et al.

(10) Patent No.: US 10,885,768 B2
(45) Date of Patent: Jan. 5, 2021

(54) SYSTEMS AND METHODS FOR MEASURING PERFORMANCE OF SITE MAINTENANCE

(71) Applicant: Tennant Company, Minneapolis, MN (US)

(72) Inventors: Daniel P. Longhenry, Bloomington, MN (US); Mark Steven Citsay, Lake Elmo, MN (US); Daniel Messer, Golden Valley, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 15/893,829

(22) Filed: Feb. 12, 2018

(65) Prior Publication Data
US 2019/0251832 A1 Aug. 15, 2019

(51) Int. Cl.
*G08C 21/00* (2006.01)
*H04B 1/3827* (2015.01)
(Continued)

(52) U.S. Cl.
CPC .............. *G08B 25/10* (2013.01); *A47L 11/00* (2013.01); *A47L 13/00* (2013.01); *G01C 21/10* (2013.01);
(Continued)

(58) Field of Classification Search
CPC .............. A01D 34/008; A47L 2201/00; A47L 2201/04; A47L 11/00; A47L 13/00;
(Continued)

(56) References Cited

U.S. PATENT DOCUMENTS 8,584,294 B2   11/2013   Loring
8,958,937 B2   2/2015    Hillman, Jr. et al.
(Continued)

FOREIGN PATENT DOCUMENTS

DE   102005027183 A1   12/2006
EP   2325713 B1        6/2013
(Continued)

OTHER PUBLICATIONS

Mayer, Harald et al., "Mobile Floor Cleaning Machine," German Patent Application No. DE102005027183A1, Dec. 14, 2006, Machine Translation of Abstract and Description, 1 page.
(Continued)

*Primary Examiner* — Dionne Pendleton
(74) *Attorney, Agent, or Firm* — Fredrikson & Byron, P.A.

(57) ABSTRACT

Systems and methods for detecting a site maintenance operation done by a maintenance device are described. At least one motion sensor and at least one localization sensor can each be operatively coupled to the maintenance device to detect one or more motion parameters of the maintenance device via the motion sensor and the localization sensor. The maintenance device can be localized (e.g., its position located) on the indoor map. A movement of the maintenance device can be characterized and/or tracked on the indoor map. A motion map can be displayed to illustrate (e.g., visually represent) the characterized movement. An offsite computer can be used to determine whether the site maintenance operation has commenced at the indoor location, measure one or more maintenance parameters of the site maintenance operation and/or compare the one or more maintenance parameters to predetermined benchmark parameters to determine whether the site maintenance operation has been completed.

21 Claims, 8 Drawing Sheets

(51) Int. Cl.
    *G08B 25/10*     (2006.01)
    *H04W 4/02*     (2018.01)
    *G06Q 10/06*     (2012.01)
    *A47L 11/00*     (2006.01)
    *G01C 21/10*     (2006.01)
    *G06Q 10/08*     (2012.01)
    *G01C 21/20*     (2006.01)
    *A47L 13/00*     (2006.01)
    *H04W 4/30*     (2018.01)
    *H04W 4/38*     (2018.01)
    *H04W 4/33*     (2018.01)
    *G01S 1/02*     (2010.01)
    *G06Q 10/00*     (2012.01)

(52) U.S. Cl.
    CPC .......... *G01C 21/206* (2013.01); *G01S 1/022* (2013.01); *G06Q 10/0639* (2013.01); *G06Q 10/06398* (2013.01); *G06Q 10/087* (2013.01); *H04W 4/027* (2013.01); *H04W 4/30* (2018.02); *H04W 4/33* (2018.02); *H04W 4/38* (2018.02); *G06Q 10/20* (2013.01)

(58) Field of Classification Search
    CPC ...... G01C 21/08; G01C 21/14; G01C 21/165; G01C 21/206; G01C 21/28; G01C 21/3676; G01C 21/3688; G01C 21/10; G01C 21/20; G01C 22/006; G05D 1/0225; G05D 1/027; G05D 1/0272; G05D 1/0274; G05D 1/0278; G05D 1/028; G05D 2201/0203; G05D 2201/0208; H04W 4/027; H04W 4/029; H04W 4/30; H04W 4/33; H04W 4/38; H04W 4/70; H04W 4/35; H04W 4/023; A63F 13/02; A63F 13/06; A63F 13/211; A63F 13/213; A63F 13/215; A63F 13/42; A63F 13/50; A63F 2300/105; A63F 2300/1062; A63F 2300/1093; A63F 2300/308; A63F 2300/6045; G01B 21/00; G01S 15/06; G01S 15/08; G01S 15/89; G01S 17/06; G01S 19/06; G01S 19/11; G01S 19/13; G01S 19/17; G01S 19/49; G01S 2013/466; G01S 2013/468; G01S 2015/465; G01S 5/0294; G01S 5/0205; G01S 5/021; G01S 1/022; G06F 3/04817; G06F 3/0486; G06F 3/167; G06K 2017/0045; G06K 9/00348; G06K 9/00536; G06K 9/22; G06Q 10/0639; G06Q 10/101; G06Q 30/0266; G06Q 30/0267; G08B 25/10; H04B 17/27; H04B 17/318; H04L 65/403; H04L 67/02; H04L 67/06; Y10S 367/907
See application file for complete search history.

(56) References Cited

U.S. PATENT DOCUMENTS

| | | | |
|---|---|---|---|
| 2005/0170850 A1* | 8/2005 | Edwards | H04W 48/02 455/456.4 |
| 2006/0103523 A1 | 5/2006 | Field | |
| 2010/0324731 A1* | 12/2010 | Letsky | A01D 34/008 700/245 |
| 2011/0304497 A1 | 12/2011 | Molyneux et al. | |
| 2015/0241222 A1* | 8/2015 | Majumdar | G01C 21/00 701/526 |
| 2017/0140285 A1* | 5/2017 | Dotan-Cohen | G06F 3/038 |
| 2017/0242412 A1* | 8/2017 | Kim | H04M 1/0202 |
| 2018/0028038 A1 | 2/2018 | Setchell et al. | |
| 2018/0328753 A1* | 11/2018 | Stenning | G01C 21/08 |
| 2019/0065984 A1* | 2/2019 | Tyagi | H04W 4/021 |
| 2020/0191896 A1* | 6/2020 | Valencia | G01S 1/022 |

FOREIGN PATENT DOCUMENTS

| | | |
|---|---|---|
| JP | 2006055214 A | 3/2006 |
| NL | 1033348 C2 | 8/2008 |

OTHER PUBLICATIONS

International Patent Application No. PCT/US2019/017665, International Search Report and Written Opinion dated May 24, 2019, 16 pages.

* cited by examiner

| Area | Status | Frequency | Start time | End time | Duration | Cleaner |
|---|---|---|---|---|---|---|
| Deli | Complete | 1 | 8:30 | 9:20 | 50min | Mary |
| Bakery | Complete | 1 | 8:30 | 9:10 | 40min | John |
| Aisle 7 | Not Cleaned | 1 | | | | |
| Bathroom | Partial | 2 | 9:15 | 10:00 | 45min | Sarah |
| | | | 12:30 | 13:30 | 1hour | Carl |

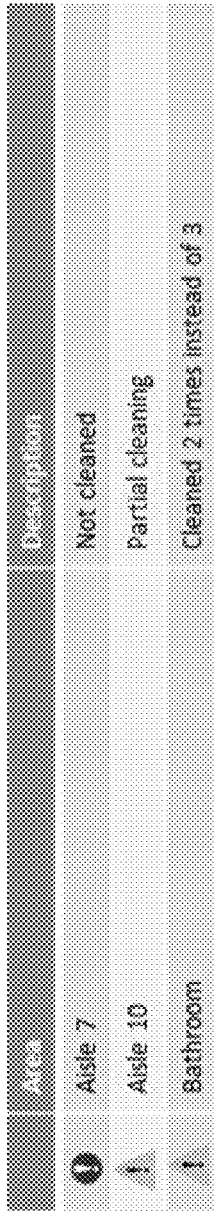
FIG. 3I
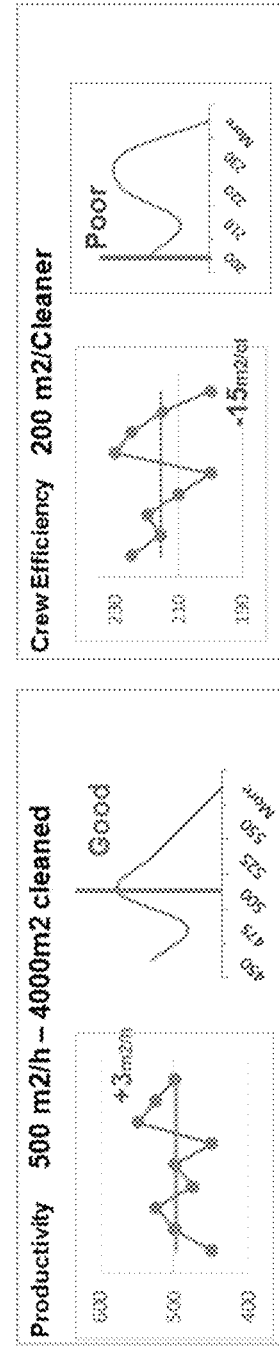
FIG. 3J
FIG. 3L
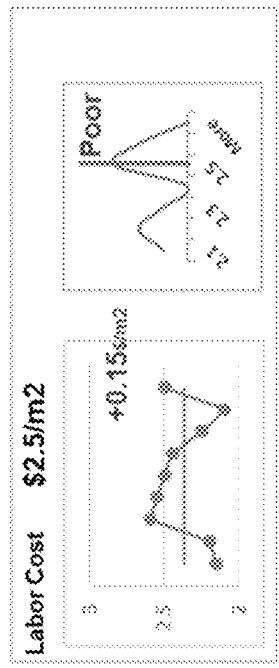
FIG. 3K

SYSTEMS AND METHODS FOR MEASURING PERFORMANCE OF SITE MAINTENANCE

BACKGROUND

Maintenance services (e.g., floor cleaning) for office buildings, industrial facilities and the like are areas where organizations and building service contractors frequently strive for reduced costs and in becoming more competitive. Such entities may also not be able to efficiently manage their assets (e.g., floor surface maintenance machines). Further, because of the lack of performance data, supervisors of maintenance service workers and/or companies may not be able to monitor and evaluate performance indicators of cleaning crews so that they may satisfy the terms of their building service contracts with building owners. Also, presently it may be challenging to measure more precise location-specific performance data, and thereby correlate performance and utilization of assets to the location of the maintenance site.

SUMMARY

Certain embodiments of the disclosure include systems and methods for detecting a site maintenance operation. A maintenance device locatable on an indoor map of an indoor location. At least one motion sensor and at least one localization sensor can each be operatively coupled to the maintenance device to detect one or more motion parameters of the maintenance device via the motion sensor and the localization sensor. The maintenance device can be localized (e.g., its position located) on the indoor map. A movement of the maintenance device can be characterized and/or tracked on the indoor map. A motion map can be displayed to illustrate (e.g., visually represent) the characterized movement.

Certain embodiments also include systems and methods for determining whether a site maintenance operation has been completed. An offsite computer can be in operative communication with the maintenance device. The offsite computer can be located external to the indoor location. The offsite computer can be used to determine whether the site maintenance operation has commenced at the indoor location. Optionally, the offsite computer can be used to measure one or more maintenance parameters of the site maintenance operation. Further, optionally, the offsite computer can be used to compare the one or more maintenance parameters to predetermined benchmark parameters to determine whether the site maintenance operation has been completed.

Certain embodiments include one or more of the following numbered embodiments:

1. A method of detecting a site maintenance operation, comprising:
   providing a maintenance device, the maintenance device being locatable on an indoor map of an indoor location;
   providing at least one motion sensor and at least one localization sensor each operatively coupled to the maintenance device;
   detecting one or more motion parameters of the maintenance device via the motion sensor and the localization sensor;
   detecting localization of the maintenance device on the indoor map; characterizing a movement of the maintenance device based on the one or more motion parameters;
   tracking the characterized movement of the maintenance device on the indoor map over time; and
   displaying a motion map, the motion map comprising the characterized movement correlated to the indoor map.
2. The method of embodiment 1, further comprising, determining whether the site maintenance operation is performed based on the one or more motion parameters detected by the motion sensor.
3. The method of embodiment 1 or 2, wherein the motion sensor and/or the localization sensor is provided on a mobile computer located in proximity to the maintenance device.
4. The method of embodiment 3 or any previous embodiment, wherein the mobile computer is a wearable computer worn by an operator.
5. The method of embodiment 4 or any previous embodiment, wherein the maintenance device comprises electronic circuits having identifying information of the maintenance device stored thereon.
6. The method of embodiment 5 or any previous embodiment, further comprising, electronically connecting the electronic circuits of the maintenance device to the mobile computer, whereupon the identifying information of the maintenance device is read by the mobile computer and transmitted to the offsite computer to permit the offsite computer to recognize the maintenance device on the indoor map.
7. The method of embodiment 6 or any previous embodiment, further comprising locating of the maintenance device in the indoor location using at least one of the following:
   the motion sensor and wireless communication networks connectable wirelessly to the mobile computer;
   cellular trilateration;
   magnetic signature of the building; and/or
   dead reckoning.
8. The method of embodiment 6 or any previous embodiment, further comprising, electronically connecting the electronic circuits of the maintenance device to the mobile computer only when an activation circuit provided on at least one of the maintenance device and the mobile computer is activated.
9. The method of embodiment 8 or any previous embodiment, wherein, an electronic connection between the electronic circuits of the maintenance device and the mobile computer comprises a wireless connection between the electronic circuits and the mobile computer.
10. The method of embodiment 1 or any previous embodiment, wherein:
    the one or more motion parameters comprise one or more of the following: speed, direction of travel, number of repetitions of motion; and/or
    wherein, the one or more localization parameters comprise one or more of the following: longitude, latitude, altitude, barometric pressure.
11. The method of embodiment 10 or any previous embodiment, wherein, characterizing the movement of the maintenance device comprises determining whether the maintenance device is:
    stationary;
    traveling in the indoor location without performing the site maintenance operation;

traveling in a serpentine movement in a portion of the indoor location, the serpentine movement being indicative of a first site maintenance operation; and performing a second site maintenance operation over an area less than an area of the portion of the indoor location.

12. The method of embodiment 1 or any previous embodiment, wherein the maintenance device is a mobile site maintenance machine comprising: one or more wheels for traveling in the indoor location, and at least one site maintenance tool, wherein the motion sensor is provided onboard on the mobile site maintenance machine.

13. The method of embodiment 1 or any previous embodiment, wherein the one or more motion parameters being measured by at least one of: inertial measurement unit, compass, and magnetometer.

14. A method of determining whether a site maintenance operation has been completed, comprising:

providing a maintenance device, the maintenance device being locatable on an indoor map of an indoor location;

providing at least one motion sensor and at least one localization sensor each operatively coupled to the maintenance device;

providing an offsite computer operatively communicating with the maintenance device, the offsite computer being located external to the indoor location;

using the offsite computer to do at least one of the following steps:

detect one or more motion parameters of the maintenance device via a motion sensor operatively coupled to the maintenance device;

track movement of the maintenance device in the indoor location;

based on the one or more motion parameters, determine whether the site maintenance operation has commenced at the indoor location;

measure one or more maintenance parameters of the site maintenance operation; and compare the one or more maintenance parameters to predetermined benchmark parameters to determine whether the site maintenance operation has been completed.

15. The method of embodiment 14 or any previous embodiment, further comprising, using the offsite computer to display the one or more maintenance parameters and/or the predetermined benchmark parameters.

16. The method of embodiment 14 or any previous embodiment, wherein the motion sensor and/or the localization sensor is provided on a mobile computer in operative communication with the maintenance device.

17. The method of embodiment 16 or any previous embodiment, further comprising:

if a maintenance parameter of the one or more maintenance parameters is less than a corresponding predetermined benchmark parameter, using the offsite computer, communicate with the maintenance device to initiate a subsequent site maintenance operation.

18. The method of embodiment 16 or any previous embodiment, further comprising:

if a maintenance parameter of the one or more maintenance parameters is less than a corresponding predetermined benchmark parameter, using the offsite computer, generate an alert to indicate that the site maintenance operation is unsatisfactory.

19. The method of embodiment 14 or any previous embodiment, further comprising using the offsite computer to determine, based on the one or more motion parameters, whether the site maintenance operation is being performed according to a predetermined sequence.

20. The method of embodiment 14 or any previous embodiment, further comprising using the offsite computer to determine, based on the one or more motion parameters, whether the maintenance device is traveling and/or performing the site maintenance operation according to a predetermined route.

BRIEF DESCRIPTION OF DRAWINGS

FIGS. 3A-3L illustrate various graphical and tabulated displays obtained from the offsite computer indicative of performance metrics of site maintenance according to an embodiment;

DETAILED DESCRIPTION

Figure 1:
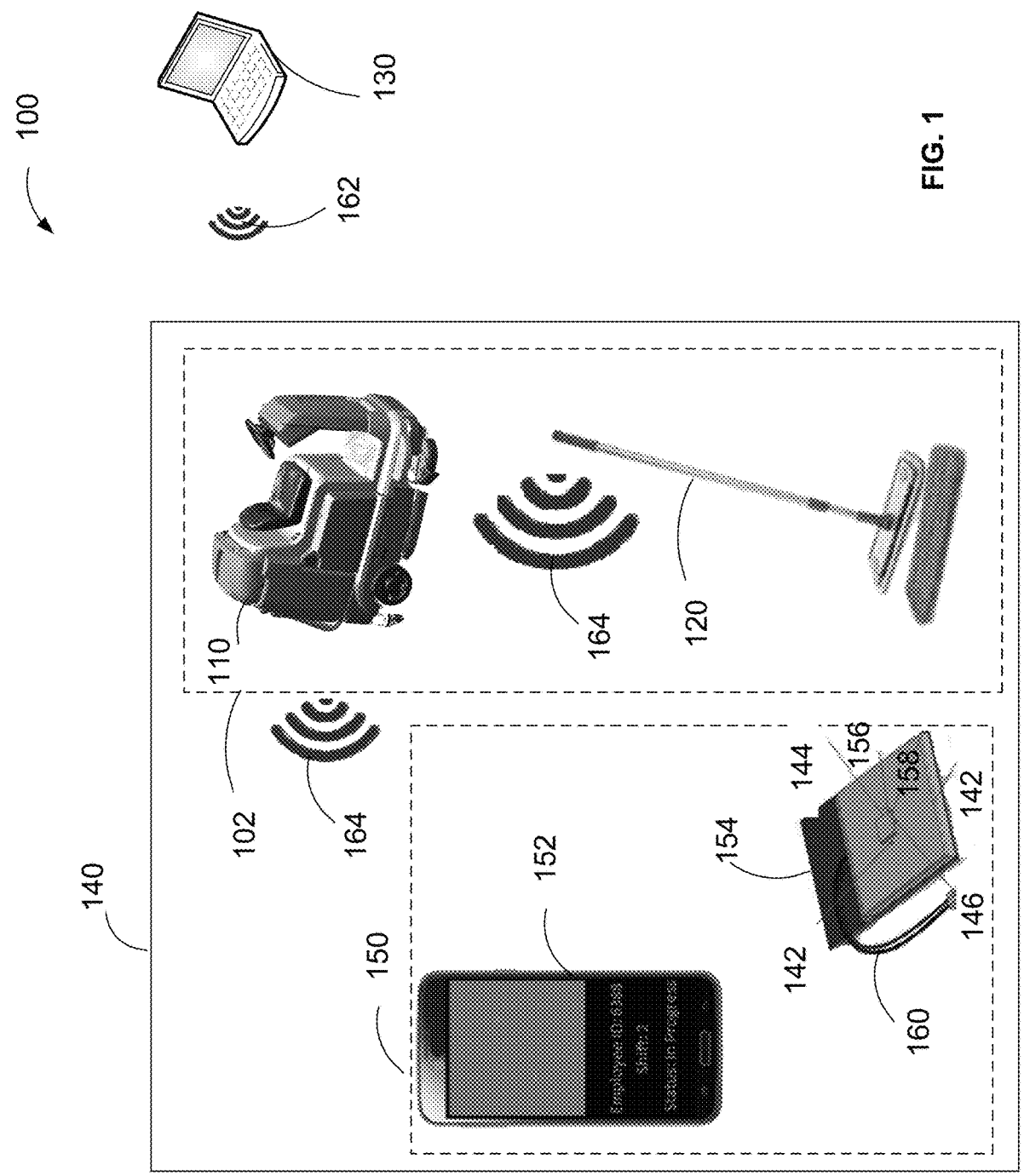
FIG. 1 is a schematic of a system for measuring performance of site maintenance according to an embodiment of the present disclosure.

FIG. 1 is a schematic of a high-level system architecture of a site maintenance measurement system 100 according to an embodiment. The site maintenance measurement system 100 can monitor and track locations of one or more maintenance devices 102, characterize a movement thereof to determine whether a site maintenance operation is being performed, and provide a visual display of one or more parameters indicative of a site maintenance operation mapped to the location of the maintenance device.

In some embodiments, the maintenance device can be one or more floor surface maintenance machines 110. Such floor surface maintenance machine 110 can be either operator-driven or operating autonomously. Alternatively, or in addition, the maintenance device can be tools 120 such as brooms, mops, dusting tools 120, buckets, dust pan, and the like that can be used by an operator to perform a site maintenance operation (e.g., cleaning, polishing, striping, etc.). The maintenance device can also be any such wheel-based equipment carrying tools In embodiments where the maintenance device is a surface maintenance machine 110, the site maintenance measurement system 100 may manage assets such as a fleet of surface maintenance machines 110. The surface maintenance machines 110 can be a ride-on machine 110 or walk-behind machines, or autonomous (driverless) vehicles 110 that perform maintenance tasks such as sweeping, carpet extraction, vacuuming, scrubbing, polishing (burnishing) etc., a surface at a maintenance site (such as indoor location 140). Any known surface maintenance operation can be performed, and the examples listed here should not be construed as limiting.

While not illustrated in detail, embodiments of the surface maintenance machine 110 include components that are supported on a mobile body supported on wheels for travel over a surface, on which a surface maintenance operation is to be performed. The mobile body may include operator controls (not shown) and a steering control such as a steering wheel. Additionally, the machine 110 includes an operator cabin for seating an operator (e.g., in a seat) who may grasp and steer the steering wheel to steer the machine 110, or engage one or more operator controls to control the machine 110 to perform one or more cleaning operations. The surface maintenance machine 110 can be powered by an on-board power source such as one or more batteries. The interior of the surface maintenance machine 110 can include electrical connections (not shown) for transmission and control of various components.

While not shown in detail in the drawings, the surface maintenance machine 110 includes a maintenance head assembly. The maintenance head assembly houses one or more maintenance tools 120 such as scrub brushes, sweeping brushes, and polishing, stripping or burnishing pads. For example, the maintenance head is a cleaning head comprising one or more cleaning tools 120 (e.g., sweeping or scrubbing brushes). Alternatively, the maintenance head is a treatment head comprising one or more treatment tools 120 (e.g., polishing, stripping or buffing pads). Many different types of surface maintenance tools 120 are used to perform one or more maintenance operations on the floor surface. These include sweeping, scrubbing brushes, polishing/burnishing and/or buffing pads. Additionally, one or more side brushes for performing sweeping, scrubbing or other operations can be provided. Such machines are described in detail in U.S. Pat. No. 8,584,294 assigned to Tennant Company of Minneapolis, Minn., the disclosure of each of which is hereby incorporated by reference in its entirety.

Embodiments of the present disclosure may be suitable for indoor or outdoor locations. Although the following description is with respect to the use of maintenance devices 102 on indoor locations such as interior of buildings (e.g., hospitals, stores, offices, enclosed parking garages, basements and the like), it should be understood that the systems and methods disclosed herein could be applied to site maintenance operations outdoors (e.g., roads, outdoor parking lots, sidewalks, and the like). Additionally, or alternatively, the site maintenance operations described herein could be applied to other types of surfaces such as desks, work surfaces, countertops, windows, walls, and the like.

Figure 2:
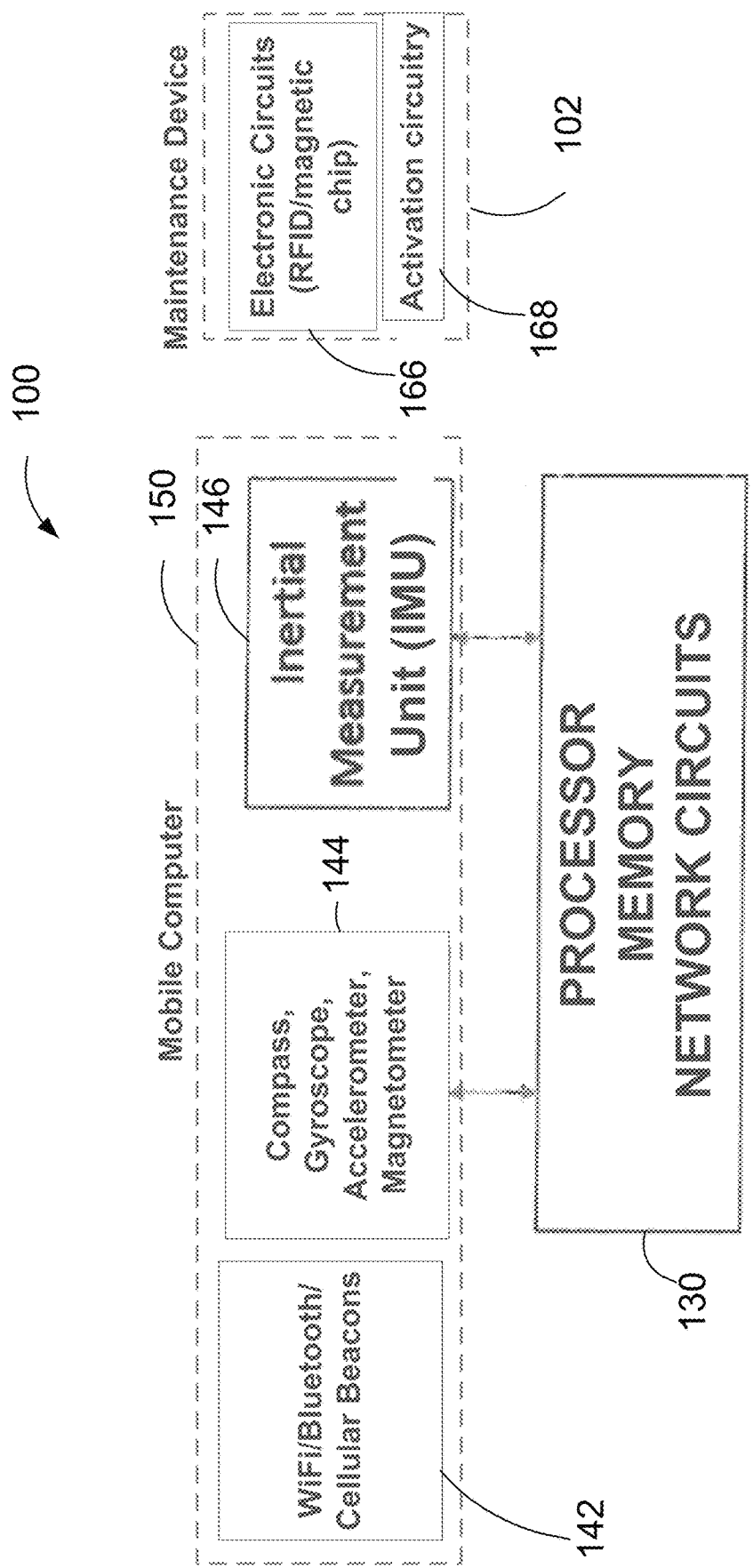
FIG. 2 is another schematic of the system illustrated in FIG. 1 showing components thereof.

Referring to FIGS. 1 and 2, various components of the site maintenance measurement system 100 are illustrated. The site maintenance measurement system 100 can be in operative communication with an offsite computer 130. The offsite computer 130 can be located either within or outside of the indoor location 140 where a site maintenance operation is to be performed. Alternatively, the offsite computer 130 can be a cloud computer. The offsite computer 130 can include a processor, a memory, and a storage. The processor can receive and store measured localization and motion parameters as will be described further below. The processor can perform one or more operations based on stored instructions in the storage. The stored instructions can be in the form of a software having executable instructions and/or algorithms.

The storage can store localization and motion parameters. The storage can also store an indoor map 304 of the indoor location 140. In such cases, software installed on the offsite computer 130 can perform report generation (as will be described below). The reports can be visual reports of one or more location-dependent performance indicators (e.g., performance and efficiency metrics described herein) mapped (e.g., heat map) on to the indoor map 304 of the indoor location 140 to help visualize performance and efficiency of the machine 110.

The offsite computer 130 can be in operative communication with the maintenance devices 102. The operative communication with the maintenance device 102 may be established when the maintenance device 102 is in operation (e.g., when receiving power, after being switched on, upon stand-by, when performing a maintenance operation, etc.). The offsite computer 130 can thus include communication circuits (e.g., Ethernet, WiFi, Bluetooth, 3G or 4G wireless networks and the like) to permit wired or wireless communication with the maintenance device. It would also be possible to use another computer (e.g., desktop or mobile computers) to connect to the offsite computer 130 to view or transmit data related to site maintenance. The operative communication between various devices, namely, the offsite computer 130, desktop or mobile computers, maintenance devices and the like can be established periodically (e.g., on an "as-needed" basis). Alternatively, the communication between various devices described herein can be established at any time.

Appreciably, different scenarios of viewing and transmitting data relevant to site maintenance operation can be envisioned. A supervisor could monitor the site maintenance data (or any statistics derived therefrom) for a maintenance crew comprising individual operators operating maintenance devices 102 after a maintenance operation has been completed. In addition, the maintenance devices 102 and/or operators operating them could be overlaid in real-time on an indoor map 304 of the indoor location 140 to simultaneously visualize the utilization and performance of the maintenance device and/or maintenance crew.

Advantageously, the site maintenance measurement system 100 can sense the location, monitor its performance and control the operation of the maintenance devices 102 (e.g., autonomously or by sending instructions to an operator) to adjust their performance based on monitored performance.

With continued reference to FIGS. 1 and 2, the offsite computer 130 can be in operative communication with a suite of location and/or motion sensors 142, 144, 146. For instance, the location and/or motion sensors 142, 144, 146 may be coupled to the offsite computer 130 by a wired or wireless connection. The location and/or motion sensors 142, 144, 146 may be on-board on the maintenance device and thus may be in operative communication with the location and/or motion sensors 142, 144, 146. Alternatively, the location and/or motion sensors 142, 144, 146 may be provided on a mobile computer 150 located in proximity to the maintenance device. In such cases, operative connection may be established between the mobile computer 150 and the offsite computer 130, in turn operatively connecting sensors 142, 144, 146 with the offsite computer 130. Alternatively or in addition, the location and/or motion sensors 142, 144, 146 may not be physically located on the maintenance device, but may instead be in operative engagement with the maintenance device.

As described previously, the operative communication between the offsite computer 130 and the sensors 142, 144, 146 can be established periodically (e.g., on an "as-needed" basis). Alternatively, the communication between the offsite computer 130 and the sensors 142, 144, 146 can be established at any time.

In certain embodiments, systems and methods disclosed herein are used at indoor locations. Accordingly, it may not be feasible to rely on Global Positioning Systems (GPS) to provide location data. Accordingly, in such embodiments, the location and/or motion sensors 142, 144, 146 may be at least one of wireless communication location and/or motion sensors 142,144,146 such as WiFi transducers, Bluetooth Beacons, sensors such as gyroscope, accelerometer, compass, magnetometer, and other similar devices to provide inertial measurements, barometers, sensors for altitude and/or height measurement and the like. In addition, more than one of a particular type of a sensor may be provided. For example, the location and/or motion sensors can use two or three accelerometers and/or magnetometers, for instance, to measure motion along multiple directions (e.g., along two or three axes). Appreciably, additional or fewer of a particular type of sensor can be included.

In advantageous aspects of the present disclosure, the location and/or motion sensors 142 may be provided on a mobile computer 150 (e.g., a mobile phone 152) in proximity of the maintenance device. Alternatively, or in addition, the location and/or motion sensors 142 (provided on a mobile computer 150) can be carried on-board by the maintenance device (e.g., surface maintenance machines 110 or vehicles 110, or tools 120). In embodiments where the site maintenance is done by a maintenance crew, the mobile computer 150 can be in possession of the maintenance crew.

The mobile computer 150 can include a processor, storage, communication circuitry and be configured to receive inputs (e.g., from operator, sensors 142, 144, 146), and provide outputs (e.g., to the operator). In advantageous embodiments, the mobile computer 150 can thus collect, pre-process, and store data from the sensors 142, 144, 146. As was the case with the offsite computer 130, the mobile computer 150 can also include a processor, memory and storage. The mobile computer 150 can also receive and store measured localization and motion parameters as will be described further below. The processor of the mobile computer 150 can perform one or more operations based on stored instructions in the storage. The stored instructions can be in the form of a software having executable instructions and/or algorithms.

In certain advantageous aspects, the mobile computer 150 may be a wearable computer 154 worn by the maintenance crew. As seen in FIG. 1, the wearable computer 154 can be in the shape of an identification badge and may be carried in person by the maintenance crew. The wearable computer 154 can include the suite of sensors 142, 144, 146 and may additionally include a processor and/or on-board storage 156, battery 158, and electrical circuits 160 for data transfer and/or charging thereof. Other Examples of such systems include a pedometry based inertial measurement system such as Activlink Insole system developed by ASTER Labs Inc., St. Paul, Minn., motionDNA® inertial system developed by Navisens, Inc., San Francisco, Calif., and the like.

Advantageously, such location and/or motion sensors 142 can detect position and movement of the maintenance devices 102 and/or operators at indoor locations where GPS signals may not reach (e.g., basements, parking ramps, etc.). Optionally, such location and/or motion sensors 142, 144, 146 may help track the maintenance devices 102 to an accuracy of about between about one centimeter and about five meters. Accordingly, systems and methods disclosed herein can provide "room-level" location data for indoor locations, permitting the offsite computer 130 to display site maintenance for one or more areas defined by a closed perimeter (e.g., rooms in the indoor location 140).

In exemplary embodiments, the maintenance device may be located on the indoor map according one or more localization methods. For instance, sensors 142, 144, 146 and wireless communication networks can wirelessly connect to the mobile computer 150 to provide localization and/or tracking (as will be described further below). Alternatively, or in addition, localization and tracking may be performed using one or more of cellular trilateration, magnetic signature of the building, and/or dead reckoning.

In certain embodiments, operative communication 162, 164 between the mobile computer 150, maintenance devices 102 (and/or operators) can allow tracking the maintenance device within the indoor location 140. According to an exemplary embodiment, the location and/or motion sensors 142, 144, 146 can be provided on a mobile computer 150 worn or carried by an operator. According to this embodiment, the maintenance device can be in operative communication with the mobile computer 150 having the location and/or motion sensors 142. For example, as seen in FIG. 2, the maintenance device can include electronic circuits 166 that can electronically (e.g., by a wired or wireless connection) connect to the mobile computer 150. The electronic circuits 166 can be a chip or a tag such as radiofrequency identification tag which can store data specific to the maintenance device thereon.

When the maintenance device is operatively connected to the mobile computer 150, the maintenance device is said to be "latched" to the mobile computer 150. The mobile computer 150 and the maintenance device may automatic latch when brought into proximity with each other. Alternatively, the mobile computer 150 may latch with the maintenance device when certain conditions are met. An example condition can involve operator intervention, such as activating an activation circuitry 168 (e.g., pressing a button on the maintenance device) and/or providing inputs to software installed on the mobile computer 150 to enable locations and/or motion sensors 142 on the mobile computer 150 to electronically connect with the electronic circuits 166 of the maintenance device.

According to some embodiments, when the mobile computer 150 and the maintenance device are latched, the maintenance device may be tracked based on location data detected using the sensors 142,144, 146 latched to the mobile computer 150. The tracking may be performed either by the mobile computer 150, or by the offsite computer 130. Alternatively, if the sensors 142, 144,146 may be provided on the mobile computer 150 or on a wearable computer 154, in which case, the tracking and localization can be performed using the processors of the mobile computer 150 or the wearable computer 154.

Figure 3A:
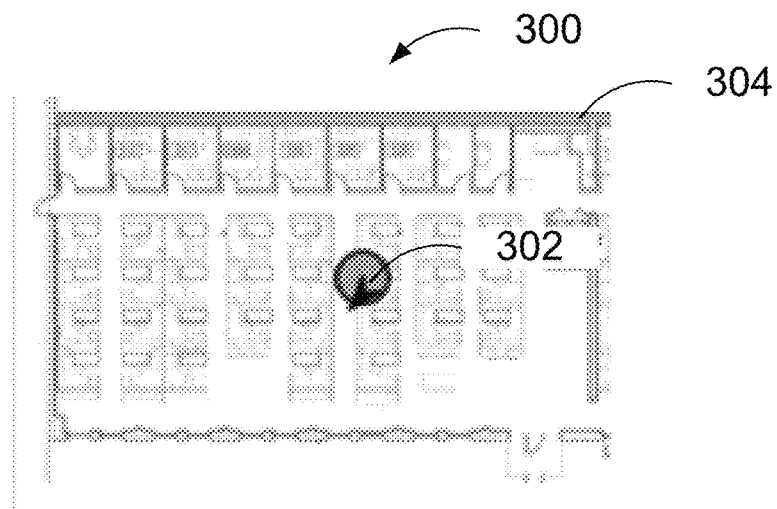

FIG. 3A illustrates a first map inlay 300 generated by the offsite computer 130 to illustrate the detected location 302 of the site maintenance device (or operator whose mobile computer 150 is latched thereto) in the indoor map 304. Appreciably, the indoor map 304 can be similar to a floor plan and include features such as rooms, doors, hallways, stairs, windows, furniture, stalls, and the like. The indoor map 304 may resemble a building plan in some embodiments.

Referencing FIGS. 2 and 3A, the electronic circuits 166 of the maintenance device may have identifying information of the maintenance device stored thereon. When the maintenance device is latched to the mobile computer 150, the identifying information of the maintenance device can be read by the mobile computer 150 and transmitted to the offsite computer 130 to permit the offsite computer 130 to recognize the maintenance device on the indoor map 304.

Figure 3B:
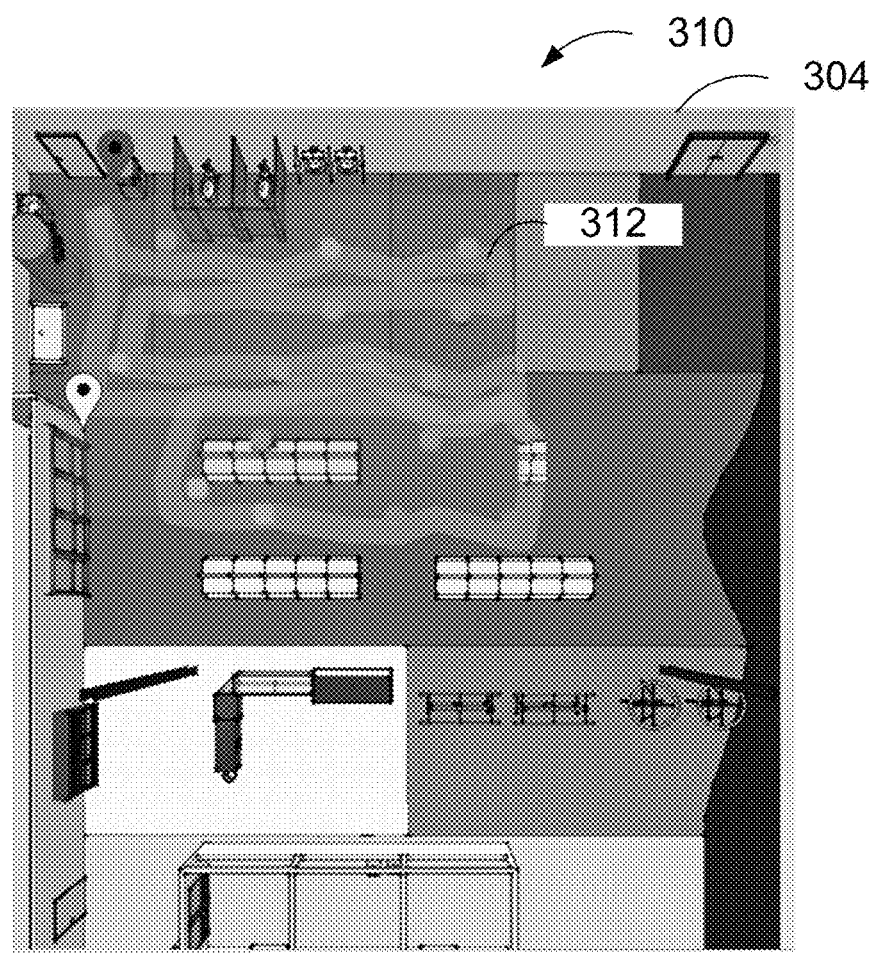

FIG. 3B illustrates a second map inlay 310 generated by the offsite computer 130 to illustrate a path 312 traveled by the site maintenance device (or operator whose mobile computer 150 is latched thereto) in the indoor map 304.

In some embodiments best seen in FIGS. 3C-3F, one of the offsite computer 130 and/or the mobile computer 150 can determine which one of the plurality of maintenance devices 102 has been latched to which one of the plurality of mobile computers. For instance, if a first operator (labeled "John" in FIGS. 3C-3D) carries a first mobile computer 150 and latches the first mobile computer 150 to a first maintenance device (e.g., dust, shown in green in FIG. 3C), the offsite computer 130 can track the first maintenance device (via its latched connection to the first mobile computer 150) through the indoor location 140. If the first operator (labeled "John" in FIGS. 3C-3D) latches the first mobile computer 150 to a second maintenance device (e.g., vacuum, shown in orange in FIG. 3D), the offsite computer 130 can track the second maintenance device (via its latched connection to the first mobile computer 150) through the indoor location 140. A second operator (labeled "Sally" in FIGS. 3E-3F) carries a second mobile computer 150 and latches the second mobile computer 150 to the first maintenance device (e.g., dust mop, shown in yellow in FIG. 3F). The offsite computer 130 can then track the first maintenance device (via its latched connection to the second mobile computer 150) as used by the second operator through the indoor location 140. Thus, some embodiments permit tracking individual maintenance devices 102 through the indoor location 140.

As described previously, data measured by the location and/or motion sensors 142 can be transmitted (e.g., using a network connection, wired or wireless connections and the like) to the offsite computer 130. In such cases, as is appreciable, the offsite computer 130 and/or mobile computer 150 may have network or wireless connection circuits to facilitate communication between the maintenance device, mobile computer 150 and/or the offsite computer 130 using one or more communication protocols. The transmitted data can include identification of the maintenance device (e.g., device name, device ID number, model number, serial number and the like) and one or more motion parameters and/or one or more localization parameters. The motion parameters can include current location, previous known location, speed, direction of travel, number of times movement was repeated between two known locations, and the like. The localization parameters can include one or more of the following: longitude, latitude, altitude, barometric pressure.

The localization and motion parameters may be transmitted in real-time (e.g., during use of the machines) the offsite computer 130 may evaluate location-dependent parameters such as maintenance performance and efficiency of one or more operators and/or one or more maintenance devices 102 in real-time. In such cases, performance feedback and/or instructions can be sent to maintenance crew in real-time. Alternatively, performance feedback and/or instructions can be sent to or directly to the maintenance device in embodiments where the maintenance device is an autonomous vehicle. Alternatively, the data may be sent periodically (e.g., after a maintenance operation is completed, daily, weekly, or in batches intermittently.)

Upon receipt of data from the location and/or motion sensors 142, the offsite computer 130 can characterize a movement of the maintenance device based on the one or more motion parameters. The offsite computer 130 can determine whether a site maintenance operation is being performed based on the motion parameters. For example, in certain embodiments, the offsite computer 130 can determine, based on the motion parameters, whether the maintenance device is stationary (e.g., speed is zero). Additionally, the offsite computer 130 can determine, based on motion parameters, whether the maintenance device is traveling in the indoor location 140 without performing the site maintenance operation. In some such embodiments, the maintenance device may have a first value of a first motion parameter when traveling, and a second value of the first motion parameter when performing the site maintenance operation.

In an example, the motion parameter can be speed and the offsite computer 130 can determine whether a maintenance operation is performed based on speed of travel of the maintenance device and/or the operator. For example, if maintenance device is a dust mop and the operator picks up the dust mop and performs sweeping, the speed of travel of the dust mop and/or the operator would be less than if the operator simply transports the dust mop without sweeping the location. Alternatively, if the maintenance device is a scrubbing vehicle, it may travel at a first speed when scrubbing and at a second speed greater than the first speed when traveling through the location without scrubbing. In such examples, the offsite computer 130 can compare the speed of the maintenance device (and/or the operator) to known values of the speed when various operations are being performed to determine whether a site maintenance operation is being performed.

In another example, the motion parameter can be a characteristic pattern of movement (e.g., speed, direction and repetitions). For example, if the maintenance device is a wet mop, a characteristic pattern of movement of the dust mop (and/or the operator) would be a repeated, serpentine motion. Accordingly, the offsite computer 130 can determine whether the speed, direction of travel and number of times movement is repeated to determine whether the maintenance device and/or operator is traveling in a serpentine movement within a portion of the indoor location 140 (e.g., a room or hallway). In this example, the serpentine movement can be indicative of a site maintenance operation (wet mopping). The offsite computer 130 can thus infer based on the characteristic pattern of movement whether a site maintenance operation is being performed.

The offsite computer 130 or the mobile computer 150 can track the characterized movement of the maintenance device on the indoor map 304 over time. The offsite computer 130 and/or the mobile computer 150 can include a processor programmed according to the algorithms disclosed herein to be in communication with the location and/or motion sensors 142, receive location data and identification information of the maintenance device, and track the location of the maintenance device and/or the operator whose mobile computer 150 is latched to the maintenance device through the indoor location 140. The offsite computer 130 can display (e.g., on one or more monitors or displays in operative communication with the offsite computer 130) the tracked characterized movement of the maintenance device on a motion map.

Referring back to FIG. 3B, in certain embodiments, the motion map can be a plan-view of the indoor location 140 showing various features of the indoor location 140 (e.g., rooms, hallways, stairs, etc.) The mobile computer 150 and/or the offsite computer 130 can, based on the characterized movements of the maintenance device, display the path 312 taken by the maintenance device overlaid on the plan view of the indoor location 140 to generate a motion map.

Figure 3C:
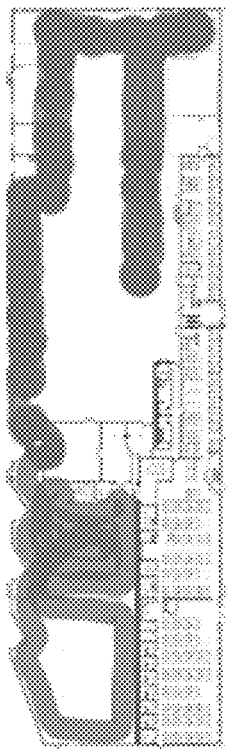
Figure 3D:
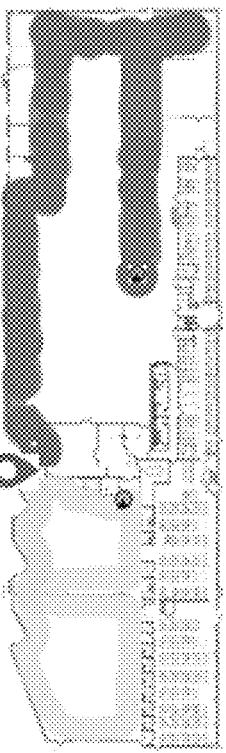
Figure 3E:
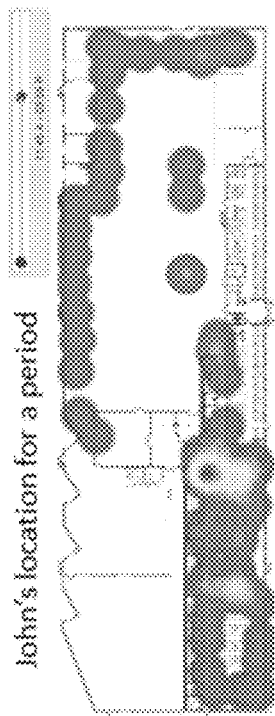
Figure 3F:
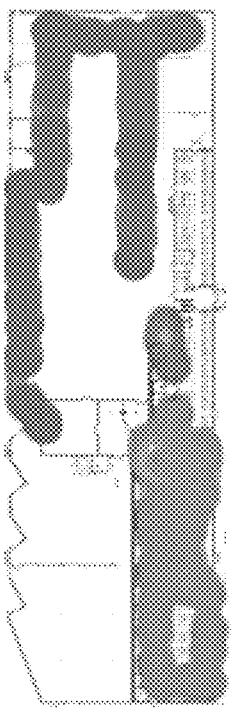

Referencing FIG. 3C, in other embodiments, the motion map can be a heat map. In such cases, one or more motion parameters can be displayed as a "heat map." For example, if the motion parameter of interest is amount of time spent in particular portion of the indoor location 140, a palettized representation of colors can be overlaid to the indoor map 304 to generate a heat map of amount of time spent in the indoor location 140. FIG. 3C illustrates one such heat map which show, by colors the amount of time spent at various portions of the indoor location 140. In FIG. 3C, areas where more time was spent can be shown in red, and areas where less time was spent can be shown in blue with yellow and orange indicating increasing amounts of time relative to areas shown in blue.

In certain embodiments, the offsite computer 130 can evaluate the performance of the maintenance crew and/or maintenance devices 102 (such as autonomous vehicles 110) based on one or more maintenance parameters. In such embodiments, the offsite computer 130 can advantageously use motion parameters to determine several outcomes. For instance, the offsite computer 130 can use the motion parameters to determine one or more of the following: whether the operator has arrived at the maintenance site, whether the operator was on time, whether maintenance operation has commenced, and the like. Further, the offsite computer 130 can, based on start and end times of site maintenance, determine how long a site maintenance operation was performed at various portions of the indoor location 140 based on motion parameters and/or location data. In some cases, the offsite computer 130 can rely on the following data to determine one or more maintenance parameters: identifiers corresponding to one or more of the maintenance devices 102, path 312 traveled by one or more maintenance devices 102, speed and direction of travel, and hours of operation of the maintenance devices 102.

In certain aspects, the mobile computer 150 and/or the offsite computer 130 can determine, based on one or more motion parameters, whether the site maintenance operation is being performed according to a predetermined sequence. For instance, certain maintenance operations can involve multiple tasks to be performed according to a sequence. One such maintenance operation can be floor striping. In such examples, a first task can involve laying caustic material on the floor surface. The second "task" may involve a wait period to allow the caustic material to set. A third task can involve coating the floor surface with a thermoplastic coating, and a fourth task can involve another wait period to allow the thermoplastic material to set. In such examples, the mobile computer 150 and/or the offsite computer 130 can, based on the motion parameters, determine whether the site maintenance operation is performed according to the sequence of tasks.

The offsite computer 130 can calculate one or more maintenance parameters based on the above motion parameters and location data. In some exemplary embodiments, the maintenance parameters can be one or more of: area in square feet maintained by each operator, area in square feet maintained per maintenance device, area in square feet maintained per hour of maintenance device for each maintenance device and/or each operator, total area maintained in the building and the like. Such performance and efficiency metrics may allow a supervisor of a maintenance crew to determine maintenance efficiency. Such performance and efficiency metrics may permit removing areas that correspond to overlap in maintenance by one or more operators and/or maintenance devices to determine effective utilization of such assets.

The offsite computer 130 can, according to some embodiments, compare one or more maintenance parameters to predetermined benchmark parameters to determine whether the site maintenance operation has been completed and if so, whether the operation was satisfactory. For instance, the predetermine benchmark parameters can be area in square foot to be maintained, amount of time to be spent per maintenance task, and the like.

In addition to the metrics listed above for individual operators and maintenance devices 102, data can be combined from all maintenance devices 102 and operators used in the indoor location 140 to determine the overall maintenance status (e.g., clean, partially clean, dirty, missed area) etc. of the indoor location 140. For example, the percent of floor area cleaned for a previous period of time, or the total hours spent at the location can be calculated.

In some such embodiments, the offsite computer 130 can track and monitor the maintenance device and/or operator in real-time as the maintenance is being performed. Accordingly, if the offsite computer 130 determines that the one or more maintenance parameters is less than the predetermined benchmark parameters, the offsite computer 130 can communicate with the maintenance device (via the mobile computer 150) to initiate a subsequent site maintenance operation. In such cases, the offsite computer 130 can generate an alert to indicate one or more of the following: operator did not arrive, operator arrived to the maintenance site but was late, maintenance operation did not start at the scheduled time or was performed for the scheduled duration, maintenance benchmark parameters were not met, the site maintenance operation was unsatisfactory (e.g., incomplete or rushed operations), a list of areas (rooms) that were supposed to be maintained but were not maintained, a list of areas (e.g., rooms) that were supposed to be maintained by a certain time but that were maintained at later time than specified.

Additionally, or alternatively, the offsite computer 130 can generate an alerts to provide positive feedback (e.g., to the maintenance crew or to a supervisor) when the site maintenance operation is satisfactory. For instance, the alerts can include information regarding one or more of the following: operator arrived to the maintenance location, operator arrived on time, maintenance operation commenced on time, maintenance benchmark parameters were met, list of areas that were maintained, list of areas where maintenance operator was done on time.

According to advantageous aspects, the offsite computer 130 can, upon determination that the one or more maintenance parameters is less than the predetermined benchmark parameters, send instructions to the maintenance device (and/or operator) to perform a subsequent site maintenance operation. The instructions can be a set of tasks that are to be performed, or can be a map of the indoor location 140 with areas to be maintained visually highlighted relative to other areas in the map.

Figures 3G, 3H:
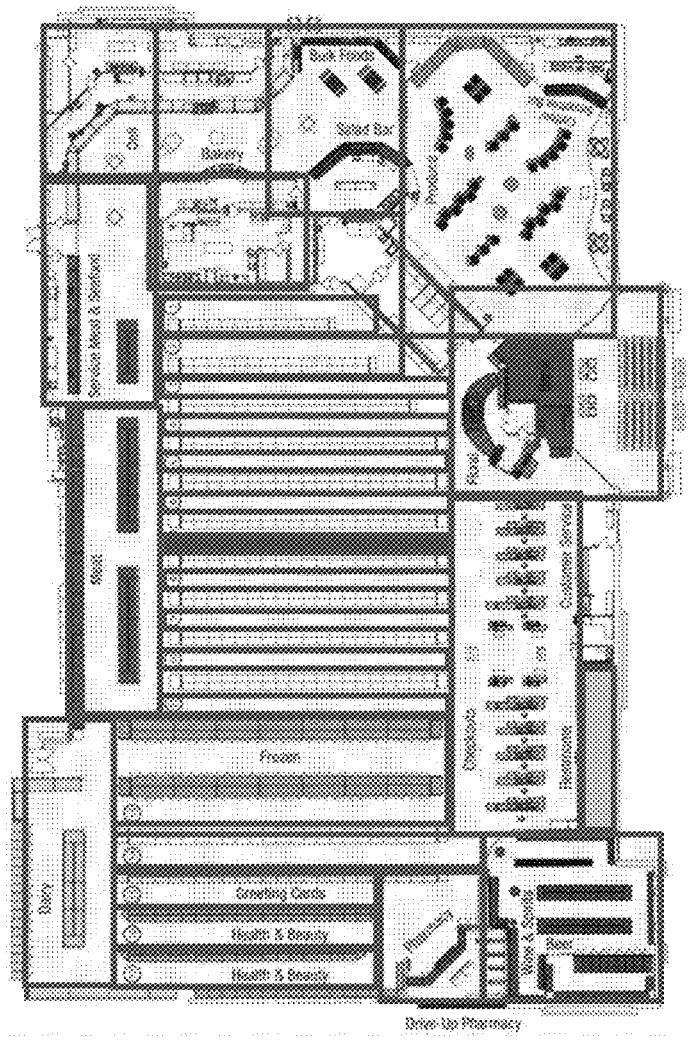

According to certain embodiments, the offsite computer 130 can display one or more maintenance parameters of site maintenance to facilitate evaluation of the performance of the one or more maintenance devices 102 and/or operators. In an embodiment, as illustrated in FIG. 3G, the offsite computer 130 can overlay a status of the maintenance site on the indoor map 304. In FIG. 3G, areas that are clean can be indicated in in a first color (e.g., green), while areas that are dirty can be indicated in a second color (e.g., orange). Further, areas that have been missed (not cleaned) are shown in a third color (e.g. red) while areas that have been cleaned more than once can be displayed as a fourth color (e.g., blue).

In addition to the map of FIG. 3G, the offsite computer 130 can display one or more maintenance parameters in a tabulated form as shown in FIG. 3H. The offsite computer 130 can determine, based on motion and location data, start and end times of a maintenance task. Advantageously, this may permit a supervisor to know whether an operator was on site at the indoor location 140, and if so, whether the operator arrived on time, and whether the maintenance task was performed according to predetermined route and/or sequence of tasks. FIG. 3I illustrate exception reporting, whereby only those maintenance parameters that were unsatisfactory (e.g., dirty areas, areas missed, operator did not arrive, and the like) are tabulated and/or shown graphically or as a map overlay. Further, as shown in FIGS. 3J-3L, the offsite computer 130 can generate graphical data that shows the maintenance parameters relative to their benchmarks. FIG. 3J illustrates productivity measured as area (in square meters) cleaned by a cleaning crew per hour. FIG. 3K illustrates labor cost, measured by cost (in dollars) per area (square meter). In FIG. 3L, crew efficiency, as measured by area (in square meters) per cleaner. In each of FIGS. 3J-3L, the benchmarks are illustrated by a solid line (e.g., 500 m$^2$/h in FIG. 3J, 200 m$^2$/cleaner in FIG. 3L, etc.)

Figure 4:
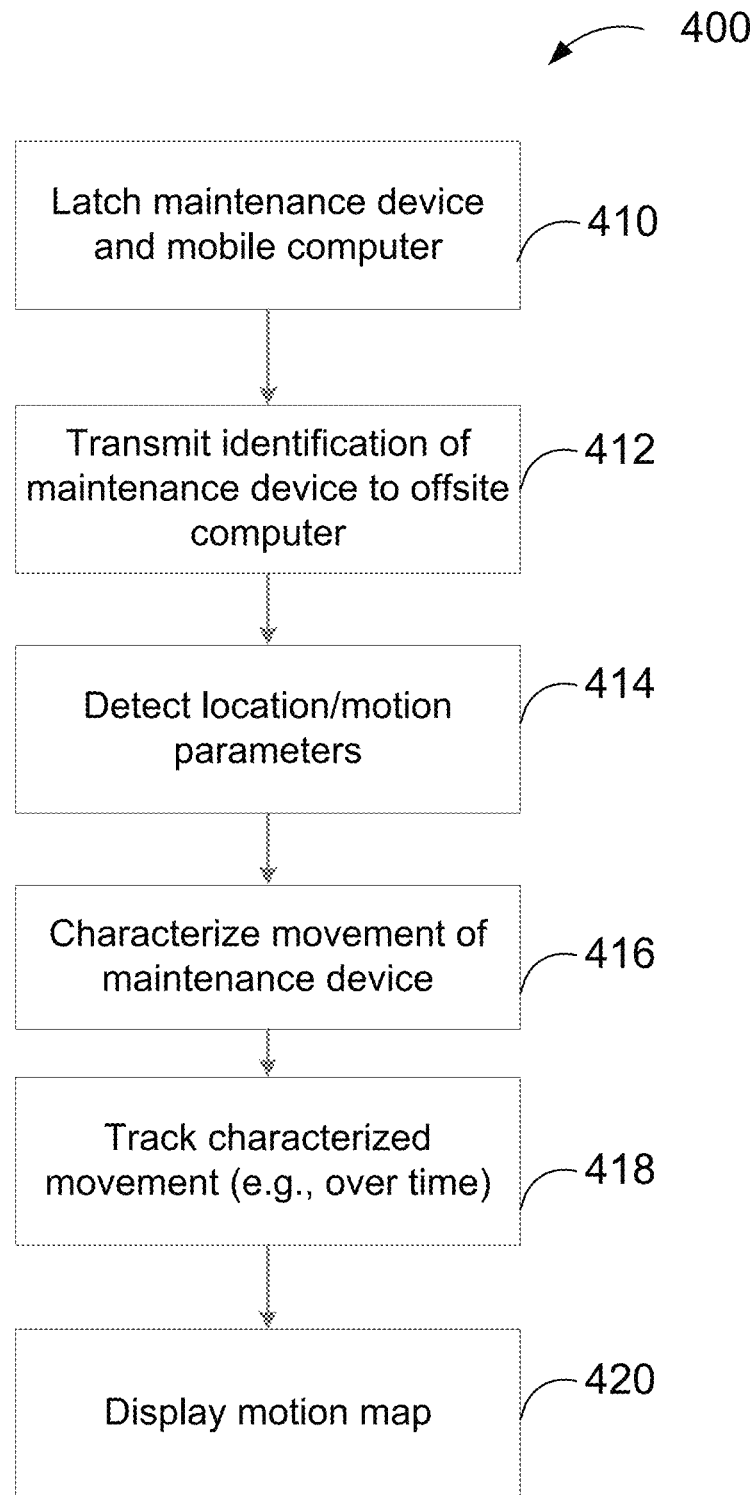
FIG. 4 is a flow chart depicting an algorithm for tracking a site maintenance device in an indoor location according to an embodiment.

FIG. 4 illustrates a method 400 of detecting a site maintenance operation according to an embodiment of the present disclosure. At step 410, a maintenance device and a mobile computer 150 latch. As described previously, this step may happen automatically when the maintenance device and the mobile computer 150 are brought into proximity. Alternatively, this step may occur upon triggering an activation circuitry 168 (e.g., pressing a button on the maintenance device and/or using a mobile computer 150 app). At step 412, the mobile computer 150 establishes a network (wired or wireless) connection with the offsite computer 130, at which point the mobile computer 150 transmits identification data stored in electronic circuits 166 of the maintenance device to the offsite computer 130. In some instances, the data transfer may occur only when a network (wired or wireless) connection between the offsite computer 130 and the mobile computer 150 is established. In such cases, until the network (wired or wireless) connection between the offsite computer 130 and the mobile computer 150 is established, the data stored in electronic circuits 166 may be held in the storage of the mobile computer 150. Data transfer between various devices (e.g., mobile computer 150, sensors 142, 144, 146, offsite computer 130, site maintenance devices) may occur in batches and may occur synchronously or asynchronously.

The offsite computer 130 can read identifying data stored in the electronic circuit (e.g., RFID chip) of the maintenance device. At this step, in embodiments where the site maintenance operation is performed non-autonomously (e.g., by a maintenance crew) the offsite computer 130 determines that the operator is on site and has picked up the maintenance device. The mobile computer 150 can record the time at which the maintenance device has been picked up.

At this point, location and/or motion sensors 142, 144, 146 may begin measuring localization and/or motion parameters. The mobile computer 150 may receive the collected data from the sensors 142, 144, 146, The mobile computer 150 may transmit such data to the offsite computer 130. At step 414, the offsite computer 130 can thus detect one or more motion parameters of the maintenance device. The motion parameters may include speed, direction of travel, number of repetitions and the like. The offsite computer 130 may, at step 416, characterize a movement of the maintenance device based on the one or more motion parameters. At this step, the offsite computer 130 determines whether the maintenance device is doing one or more of the following: being stationary, traveling in the indoor location 140 without performing the site maintenance operation (e.g., based on speed), traveling in a serpentine movement (e.g., based on speed, location, number of repetitions) in a portion of the indoor location 140, indicative of a first site maintenance operation (e.g., mopping), performing a second site maintenance operation over an area less than an area of the portion of the indoor location 140 (e.g., cleaning up localized spills, etc.).

At step 418, the offsite computer 130 tracks the characterized movement of the maintenance device on the indoor map 304 over time and at optional step 420, displays a motion map (e.g., as illustrated in FIGS. 3A-3F) where the characterized movement correlated to (e.g., overlaid on) on the indoor map 304.

Figure 5:
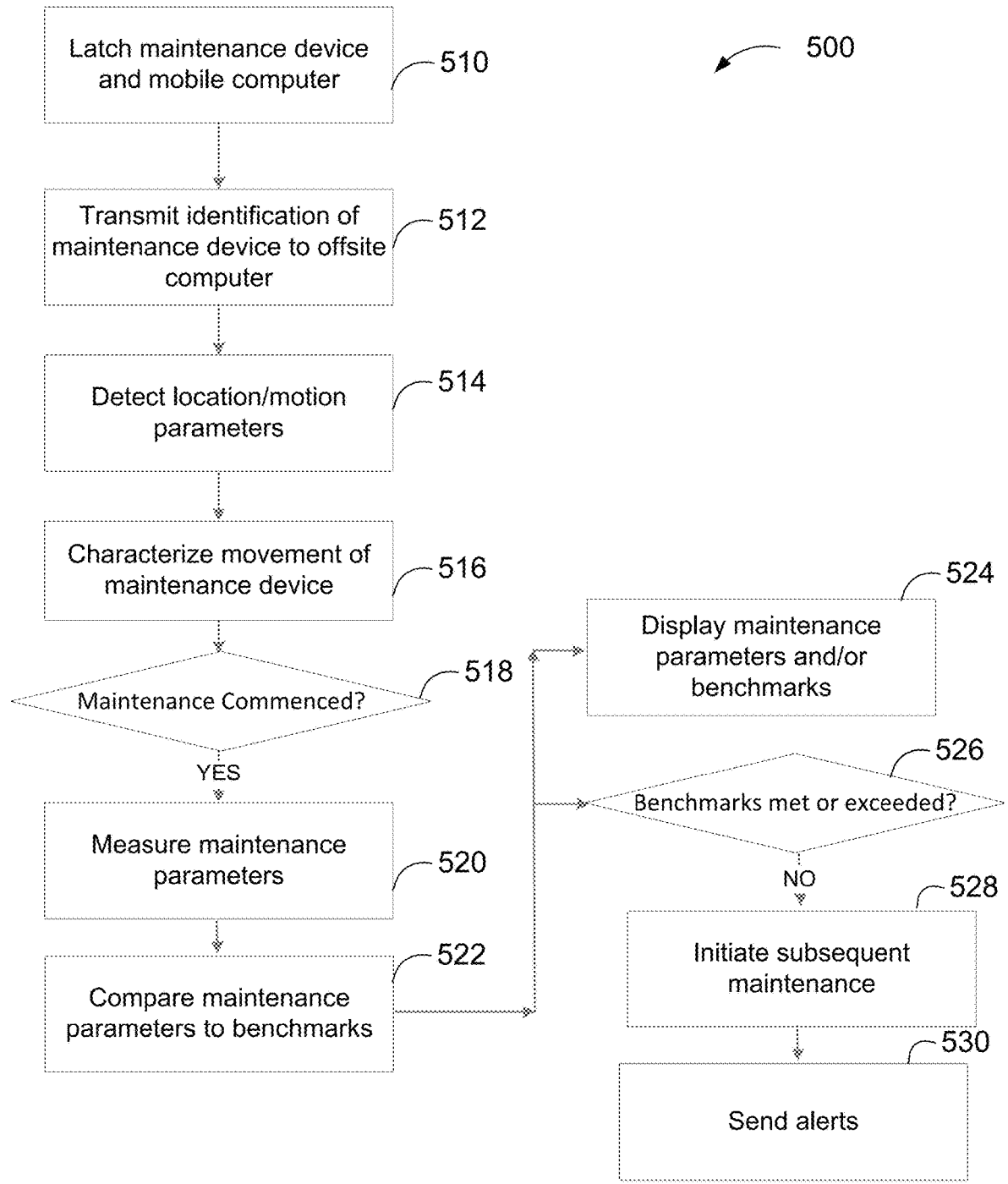
FIG. 5 is a flow chart depicting an algorithm for measuring the performance of site maintenance according to an embodiment.

FIG. 5 illustrates a method of detecting whether a site maintenance operation has been completed according to another embodiment. At step 510, a maintenance device and a mobile computer 150 latch. As described previously, this step may happen automatically when the maintenance device and the mobile computer 150 are brought into proximity. Alternatively, this step may occur upon triggering an activation circuitry 168 (e.g., pressing a button on the maintenance device and/or using a mobile computer 150 app). At step 512, the mobile computer 150 transmits identification data stored in electronic circuits 166 of the maintenance device. For instance, the offsite computer 130 can read identifying data stored in the electronic circuit (e.g., RFID chip) of the maintenance device. At this step, in embodiments where the site maintenance operation is performed non-autonomously (e.g., by a maintenance crew) the offsite computer 130 determines that the operator is on site and has picked up the maintenance device. The offsite computer 130 can record the time at which the maintenance device has been picked up.

At this point, location and/or motion sensors 142 may begin measuring location data and/or motion parameters and may transmit such data to the offsite computer 130. At step 514, the offsite computer 130 can thus detect one or more motion parameters of the maintenance device. The motion parameters may include speed, direction of travel, number of repetitions and the like. The offsite computer 130 may, at step 516, characterize a movement of the maintenance device based on the one or more motion parameters. At step 518, the offsite computer 130 may determine whether the site maintenance operation has commenced at the indoor location 140 (e.g., mopping has commenced, vehicle is scrubbing, spills have been cleaned, etc.). At step 520, the offsite computer 130 can measure one or more maintenance parameters of the site maintenance operation. The maintenance parameters can be area (in square foot) that has been maintained, areas that have been missed, start and end times of maintenance operations, sequence followed, route followed, and the like.

At step 522 the offsite computer 130 compare the one or more maintenance parameters to predetermined benchmark parameters (e.g., target area, hours of maintenance, etc.) to determine whether the site maintenance operation has been completed. At optional step 524, the offsite computer 130 displays (e.g., map overlays, tabulated data, exception data, etc.) the one or more maintenance parameters and/or the predetermined benchmark parameters. At optional step 526, if the one or more maintenance parameters are less than the predetermined benchmark parameters, the offsite computer 130 communicates at step 528 with the site maintenance device to initiate a subsequent site maintenance operation. At optional step 530, if the one or more maintenance parameters are less than the predetermined benchmark parameters, the offsite computer 130 generates an alert to indicate that the site maintenance operation is unsatisfactory. Sit should be understood that the exemplary embodiments disclosed herein are not exhaustive. Appreciably, additional analytics and functionalities may be developed based on the data collected by sensors 142, 144, 146.

Embodiments such as those described herein may allow evaluation and management of assets such as floor surface maintenance vehicles 110. The embodiments described herein can be provided on existing machines or vehicles 110 thereby lowering cost. Such embodiments facilitate monitoring operator productivity and improving utilization or efficiency of assets.

The details of one or more examples are set forth in the accompanying drawings and the description below. Other features, objects, and advantages will be apparent from the description and drawings, and from the claims.

The invention claimed is:

1. A method of detecting a site maintenance operation, comprising:
   providing a localization system operatively coupled to a maintenance device;
   detecting, via the localization system, a localization of the maintenance device;
   identifying a type of the maintenance device;
   tracking a movement of the maintenance device based on the detected localization; and
   determining whether the site maintenance operation is performed based on the tracked movement being indicative of performance of the site maintenance operation for the type of maintenance device identified, the tracked movement being indicative of performance of the site maintenance operation for the type of maintenance device identified when the maintenance device has a first value of a first motion parameter that is different than a second value of the first motion parameter, the second value of the first motion parameter being associated with maintenance device movement without performing the site maintenance operation.

2. The method of claim 1, further comprising, detecting one or more motion parameters via the localization system, and determining whether the site maintenance operation is performed based on the one or more motion parameters.

3. The method of claim 1, wherein the localization system is provided on a mobile computer located in proximity to the maintenance device.

4. The method of claim 3, wherein the mobile computer is a wearable computer worn by an operator.

5. The method of claim 4, wherein the maintenance device comprises electronic circuits having identifying information of the maintenance device stored thereon.

6. The method of claim 5, further comprising:
   providing the maintenance device, the maintenance device being locatable on an indoor map of an indoor location, and
   electronically connecting the electronic circuits of the maintenance device to the mobile computer, whereupon the identifying information of the maintenance device is read by the mobile computer and transmitted to the offsite computer to permit the offsite computer to recognize the maintenance device on the indoor map.

7. The method of claim 6, further comprising locating of the maintenance device in the indoor location using at least one of the following:
   the localization system and wireless communication networks connectable wirelessly to the mobile computer;
   cellular trilateration;
   magnetic signature of the building; and/or
   dead reckoning.

8. The method of claim 6, further comprising, electronically connecting the electronic circuits of the maintenance device to the mobile computer only when an activation circuit provided on at least one of the maintenance device and the mobile computer is activated.

9. The method of claim 8, wherein, an electronic connection between the electronic circuits of the maintenance device and the mobile computer comprises a wireless connection between the electronic circuits and the mobile computer.

10. The method of claim 1, further comprising:
    characterizing a movement of the maintenance device based on the detected localization;
    tracking the characterized movement of the maintenance device on an indoor map over time; and
    displaying a motion map, the motion map comprising the characterized movement correlated to the indoor map;
    wherein determining whether the site maintenance operation is performed is based on the characterized movement being indicative of performance of the site maintenance operation for the type of maintenance device identified, and
    wherein characterizing the movement of the maintenance device comprises using one or more of speed, direction of travel, and number of repetitions of motion and one or more of longitude, latitude, altitude, and barometric pressure.

11. The method of claim 1, wherein determining whether the maintenance device is traveling in a characteristic pattern of motion includes using parameters being measured by at least one of: inertial measurement unit, compass, and magnetometer.

12. The method of claim 1, wherein the tracked movement indicative of performance of the site maintenance operation for the type of maintenance device identified is serpentine movement.

13. The method of claim 1, wherein the maintenance device is a mobile site maintenance machine comprising:
    one or more wheels for traveling in the indoor location, and
    at least one site maintenance tool, wherein the motion sensor is provided onboard on the mobile site maintenance machine.

14. A method of detecting a site maintenance operation, comprising:
    providing a maintenance device, the maintenance device being locatable on an indoor map of an indoor location;
    providing a localization system operatively coupled to the maintenance device;
    detecting, via the localization system, a localization of the maintenance device on the indoor map; and
    determining whether the maintenance device is traveling in a characteristic pattern of motion in a portion of the indoor location, the characteristic pattern of motion being indicative of performance of a first site maintenance operation for an identified type of maintenance device, the characteristic pattern of motion being indicative of performance of the first site maintenance operation for the identified type of maintenance device when the maintenance device has a first value of a first motion parameter that is different than a second value of the first motion parameter that is associated with maintenance device travel without performing the first site maintenance operation.

15. The method of claim 14, wherein the characteristic pattern of motion indicative of a first site maintenance operation is serpentine movement.

16. The method of claim 14, wherein the maintenance device is a mobile site maintenance machine comprising:
one or more wheels for traveling in the indoor location, and at least one site maintenance tool,
wherein a motion sensor is provided onboard on the mobile site maintenance machine.

17. The method of claim 14, wherein the localization system is provided on a mobile computer located in proximity to the maintenance device.

18. The method of claim 14, wherein the maintenance device comprises electronic circuits having identifying information of the maintenance device stored thereon.

19. The method of claim 18, further comprising electronically connecting the electronic circuits of the maintenance device to the mobile computer, whereupon the identifying information of the maintenance device is read by the mobile computer and transmitted to the offsite computer to permit the offsite computer to recognize the maintenance device on the indoor map.

20. The method of claim 14, further comprising displaying a motion map, the motion map comprising the characterized movement correlated to the indoor map, wherein characterizing the movement of the maintenance device comprises using one or more of speed, direction of travel, and number of repetitions of motion and one or more of longitude, latitude, altitude, and barometric pressure.

21. A method of detecting a site maintenance operation, comprising:
providing a maintenance device, the maintenance device being locatable on an indoor map of an indoor location;
providing a localization system operatively coupled to the maintenance device;
detecting, via the localization system, a localization of the maintenance device on the indoor map;
identifying a type of the maintenance device;
tracking a movement of the maintenance device based on the detected localization; and
determining whether the site maintenance operation is performed based on the tracked movement being indicative of performance of the site maintenance operation for the type of maintenance device identified,
wherein the maintenance device is a mobile site maintenance machine comprising:
one or more wheels for traveling in the indoor location, and
at least one site maintenance tool,
wherein a motion sensor is provided onboard on the mobile site maintenance machine.

* * * * *